US012187383B2

(12) United States Patent
Kuramoto et al.

(10) Patent No.: US 12,187,383 B2
(45) Date of Patent: Jan. 7, 2025

(54) DRIVE DEVICE AND ELECTRIC VEHICLE

(71) Applicant: NIDEC CORPORATION, Kyoto (JP)

(72) Inventors: Tadahiro Kuramoto, Kyoto (JP); Toshiyuki Sasaki, Kyoto (JP); Takeshi Ohiro, Kyoto (JP)

(73) Assignee: NIDEC CORPORATION, Kyoto (JP)

( * ) Notice: Subject to any disclaimer, the term of this patent is extended or adjusted under 35 U.S.C. 154(b) by 408 days.

(21) Appl. No.: 17/666,572

(22) Filed: Feb. 8, 2022

(65) Prior Publication Data

US 2022/0250714 A1 Aug. 11, 2022

(30) Foreign Application Priority Data

Feb. 8, 2021 (JP) ................... 2021-018633

(51) Int. Cl.
*B62M 6/75* (2010.01)
(52) U.S. Cl.
CPC ..................... *B62M 6/75* (2013.01)
(58) Field of Classification Search
CPC .......... F16H 57/023; F16H 63/34; B62M 6/75
USPC ....................................... 180/65.6
See application file for complete search history.

(56) References Cited

U.S. PATENT DOCUMENTS 11,133,727 B2 * 9/2021 Kinjo ............... H02K 7/088
2020/0251958 A1 * 8/2020 Kinjo ............... H02K 7/083

FOREIGN PATENT DOCUMENTS

JP 2012202420 10/2012
JP 2018141518 9/2018
JP 2019132411 8/2019

\* cited by examiner

*Primary Examiner* — James A Shriver, II
*Assistant Examiner* — Hilary L Johns
(74) *Attorney, Agent, or Firm* — JCIPRNET

(57) ABSTRACT

A drive device includes a motor, an output part outputting torque to the outside, a gear part transmitting torque of the motor to the output part, and a housing having an internal space. The gear part includes at least one gear shaft extending in an axial direction, to which at least one gear is fixed, and a gear case accommodating the gear. The gear case includes a wall part facing an outer circumferential surface of the accommodated gear in a radial direction and extending in a circumferential direction and an opening adjacent to the wall part in the circumferential direction and penetrating in the radial direction. The opening faces the housing in the radial direction, and in a rotation direction of the gear, the wall part includes a front end disposed on a front side of the opening and adjacent to the opening. The front end contacts the housing.

11 Claims, 14 Drawing Sheets

DRIVE DEVICE AND ELECTRIC VEHICLE

CROSS REFERENCE TO RELATED APPLICATIONS

The present invention claims priority under 35 U.S.C. § 119 to Japanese Application No. 2021-018633 filed on Feb. 8, 2021, the entire content of which is incorporated herein by reference.

FIELD OF THE INVENTION

The disclosure relates to a drive device and an electric vehicle.

BACKGROUND

Conventionally, a driving force transmission device using a gear and a lubricating oil for lubricating the gear is known. In the driving force transmission device, an accommodating part accommodating the gear is disposed in a transmission case.

Since the above driving force transmission device has a configuration in which the accommodating part is accommodated inside the transmission case, it is difficult to reduce the size of the transmission case.

SUMMARY

An exemplary drive device of the disclosure includes a motor, an output part outputting torque to the outside, a gear part transmitting torque of the motor to the output part, and a housing having an internal space in which the motor, a portion of the output part, and the gear part are accommodated. The gear part includes at least one gear shaft extending in an axial direction, to which at least one gear is fixed, and a gear case accommodating the gear. The gear case includes a wall part facing an outer circumferential surface of the accommodated gear in a radial direction and extending in a circumferential direction and an opening adjacent to the wall part in the circumferential direction and penetrating in the radial direction. The opening faces the housing in the radial direction, and in a rotation direction of the gear, the wall part includes a front end disposed on a front side of the opening and adjacent to the opening, and the front end contacts the housing.

The above and other elements, features, steps, characteristics and advantages of the present disclosure will become more apparent from the following detailed description of the preferred embodiments with reference to the attached drawings.

DETAILED DESCRIPTION

Figure 1:
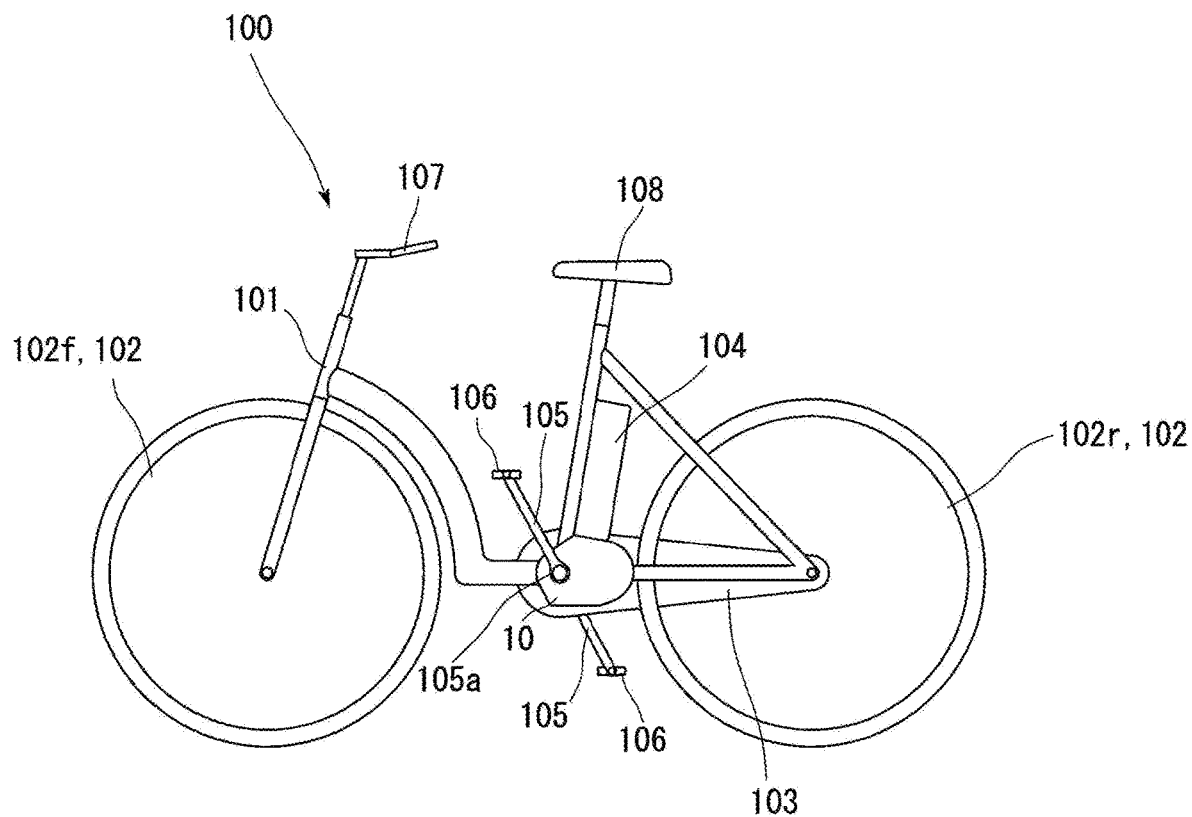
FIG. 1 is a schematic view of an electric vehicle according to an embodiment of the disclosure.
Figure 1:
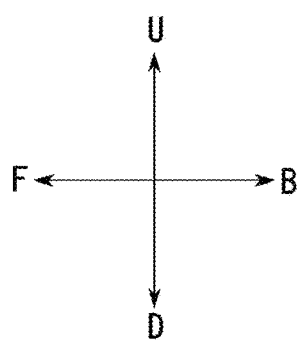

Hereinafter, an exemplary embodiment of the disclosure will be described in detail with reference to the drawings. In this specification, in the description of a drive device 10, a direction parallel to a central axis J2 of a first gear shaft 41 of the drive device 10 shown in FIG. 1 is referred to as an "axial direction." In addition, a direction orthogonal to the central axis of each rotatable shaft is referred to as a "radial direction," and a direction along the arc centered on the central axis is referred to as a "circumferential direction." In addition, based on a state of attachment to an electric vehicle 100, the travelling direction of the electric vehicle 100 is referred to as "forward F," and the opposite direction is referred to as "backward B." In addition, "upward U," "downward D," "left L," and "right R" are defined while facing forward. Here, directions in the following description are defined for ease of explanation, and may not match the directions of the drive device 10 actually used.

FIG. 1 is a schematic view of an electric vehicle according to an embodiment of the disclosure. In the present embodiment, the electric vehicle 100 is an electrically assisted bicycle that assists a user with stepping on a pedal 106. As shown in FIG. 1, the electric vehicle 100 includes a vehicle body 101, two wheels 102, a power transmission system 103, the drive device 10, and a power supply part 104.

The vehicle body 101 includes a handle 107 and a saddle 108. The two wheels 102, the power transmission system 103, the drive device 10 and the power supply part 104 are attached to the vehicle body 101. The two wheels 102 are attached to the front part of the vehicle body 101 as a front wheel 102f and to the rear part thereof as a rear wheel 102r. The power transmission system 103 is connected to the rear wheel 102r.

The power transmission system 103 includes a crank 105 attached to a crankshaft 105a and the pedal 106. In addition, the power transmission system 103 further includes a drive gear attached to an output part 30 (to be described below) of the drive device 10, a driven gear attached to the rear wheel 102r, and a chain connecting the drive gear and the driven gear (none of which is shown). The crank 105 is fixed to the crankshaft 105a that is rotatably attached to the vehicle body 101. In addition, the pedal 106 is rotatably attached to the tip of the crank 105.

The drive device 10 is attached to the power transmission system 103. The drive device 10 transmits torque from the output part 30 (refer to FIG. 2) to the power transmission system 103. The torque transmitted from the drive device 10 is transmitted to the rear wheel 102r via the power transmission system 103. That is, the electric vehicle 100 includes the power transmission system 103 that transmits an output from the output part 30 to the rear wheel 102r.

Here, the output part 30 of the drive device 10 is defined by a single member with an output gear 31 to be described below, but the disclosure is not limited thereto. For example, the output part 30 may be configured to also serve as the crankshaft 105a. That is, as the drive device 10, any configuration that is able to assist with rotation of a wheel using a force from the user is able to be widely used.

The power supply part 104 is attached to the vehicle body 101. The power supply part 104 is, for example, a battery, and supplies power to a motor 20 (to be described below) of the drive device 10 via a wiring shown in the drawing. That is, the electric vehicle 100 includes the drive device 10 and the power supply part 104 that supplies power to the motor 20 of the drive device 10.

In the electric vehicle 100, torque is applied to the crankshaft 105a when the user seated on the saddle 108 steps on the pedal 106. The torque applied to the crankshaft 105a is transmitted to the rear wheel 102r via the output part 30 and the power transmission system 103. The rear wheel 102r is rotated by the transmitted torque, and the electric vehicle 100 travels. Thus, the drive device 10 detects the torque applied to the crankshaft 105a, and as necessary, applies the torque from the output part 30 to the power transmission system 103. The torque transmitted from the output part 30 is added to the torque for travel of the electric vehicle 100. That is, the drive device 10 assists with torque required for travel of the electric vehicle 100 as necessary.

Figure 2:
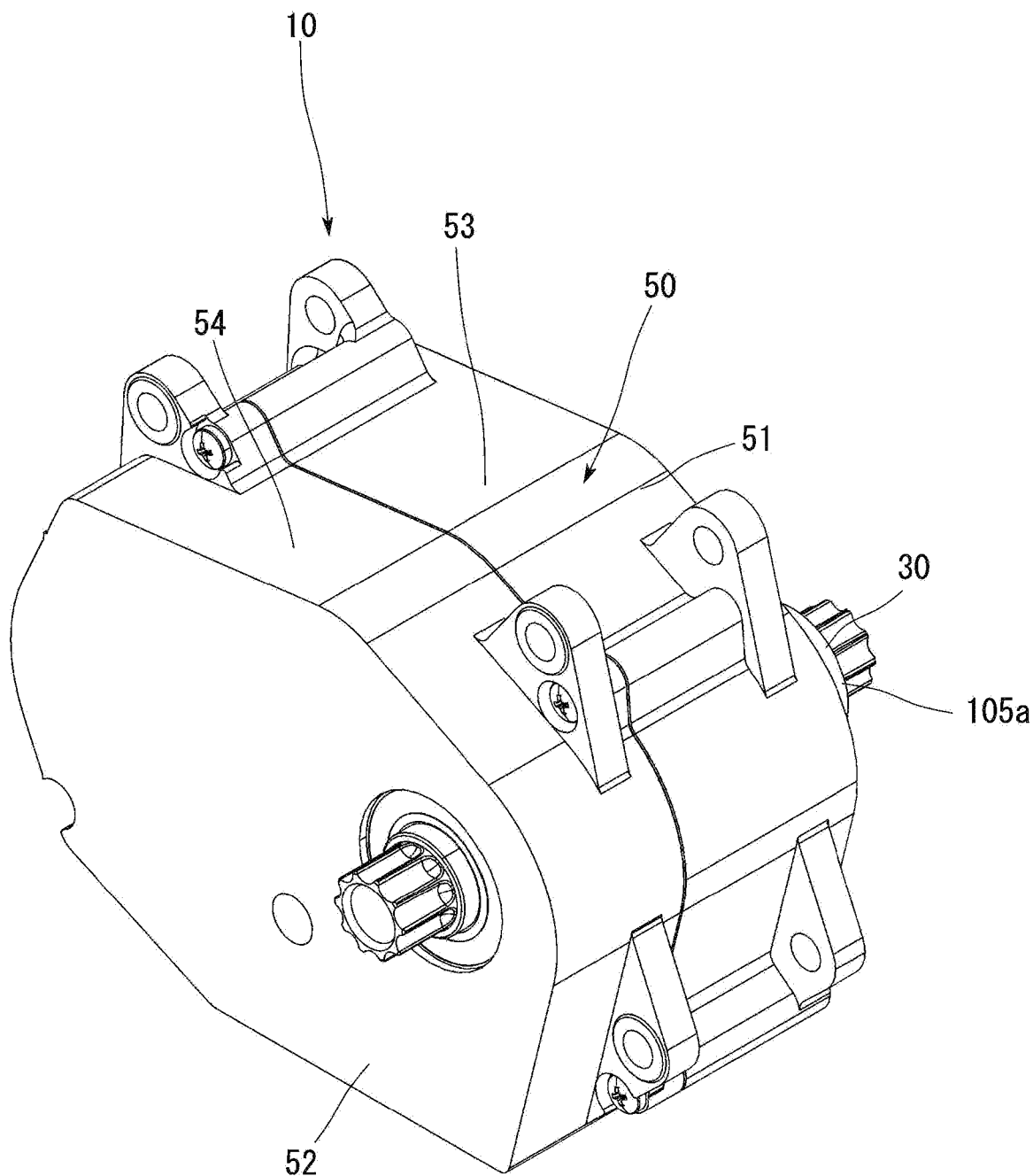
FIG. 2 is a perspective view of a drive device.
Figure 2:
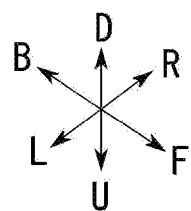
Figure 3:
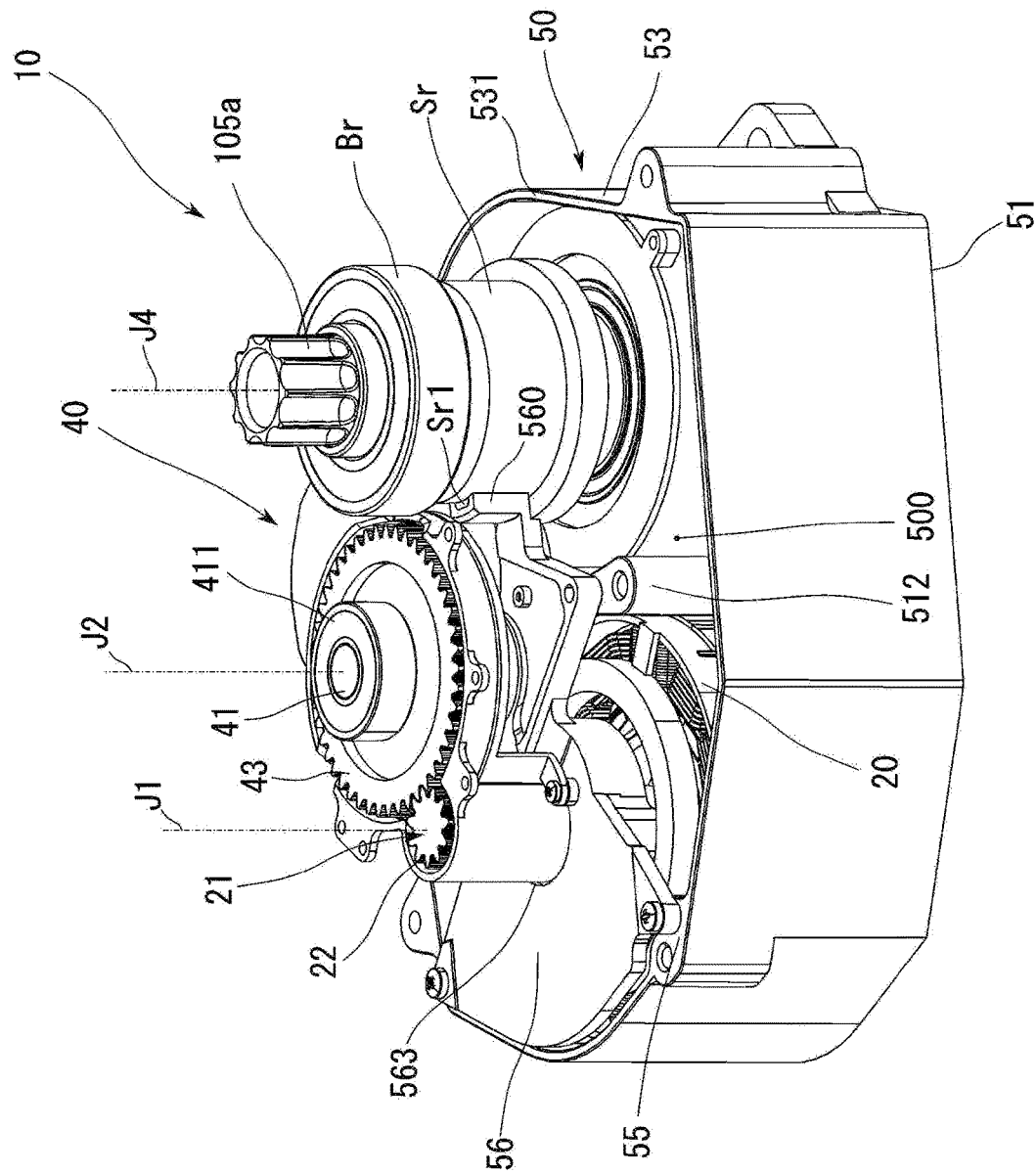
FIG. 3 is a perspective view from the upper left of the inside of the drive device from which a second plate member and a second cylinder part are removed.
Figure 4:
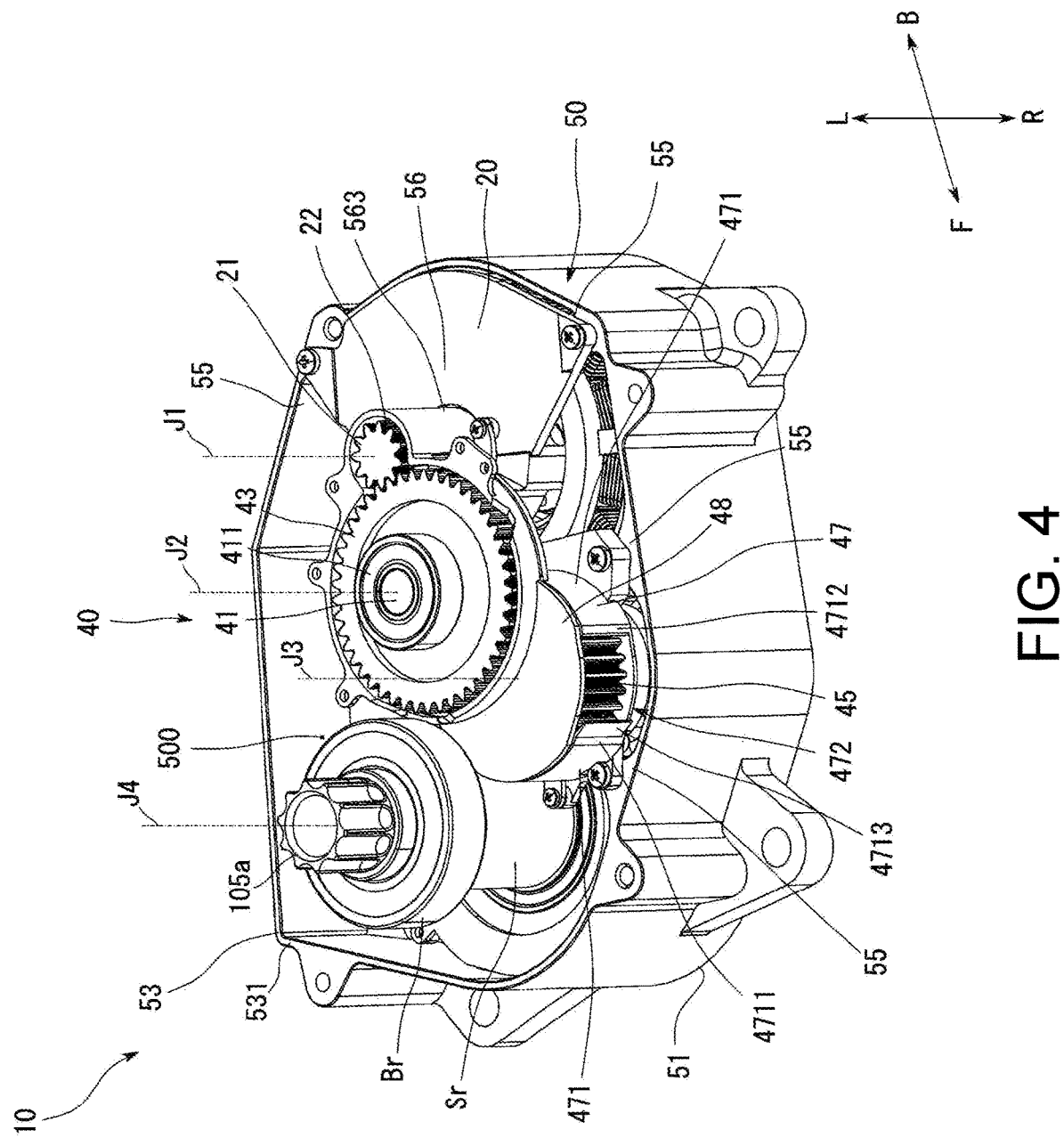
FIG. 4 is a perspective view from the lower left of the inside of the drive device from which a second plate member and a second cylinder part are removed.
Figure 5:
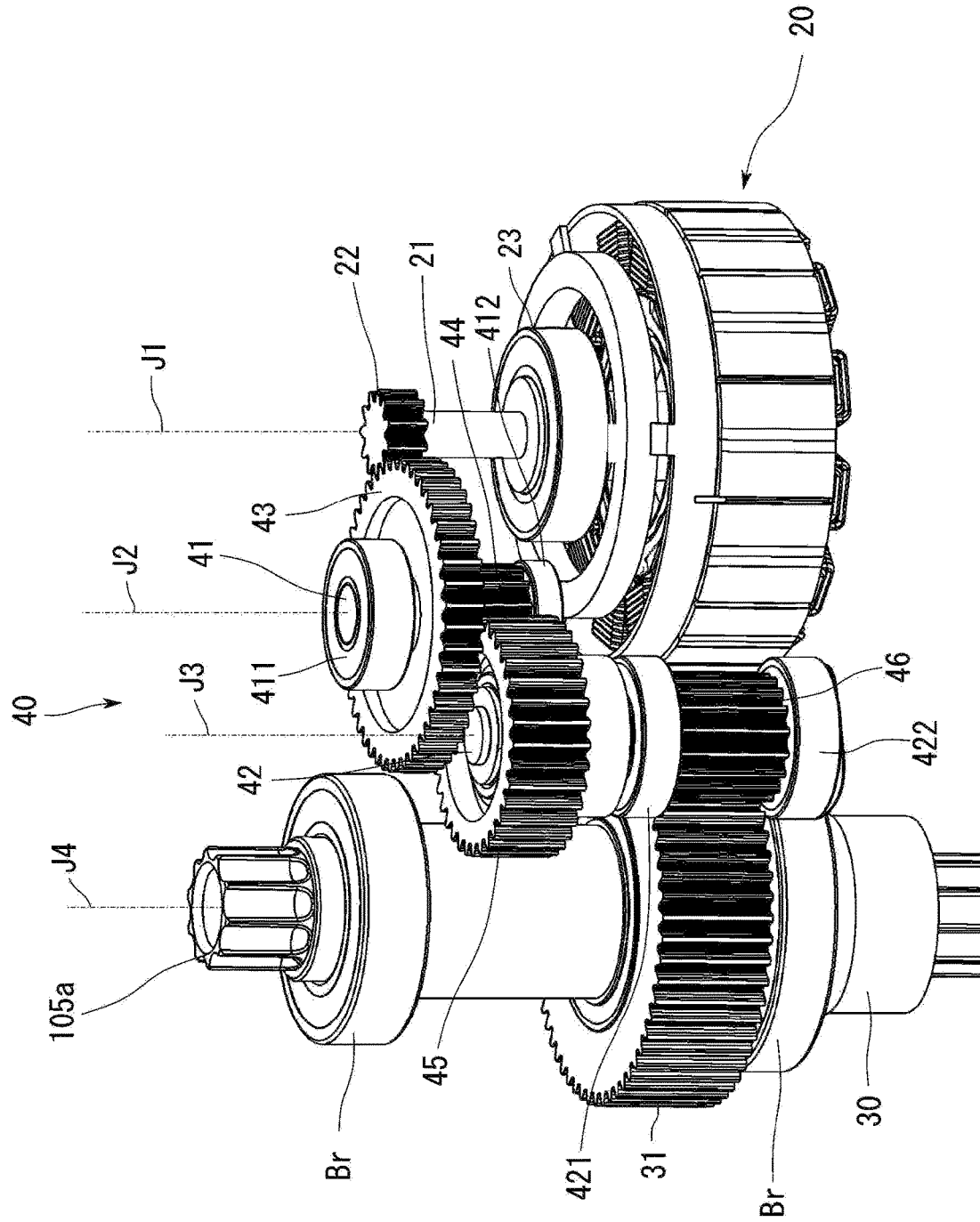
FIG. 5 is a schematic perspective view showing engagement between gears of gear parts.
Figure 6:
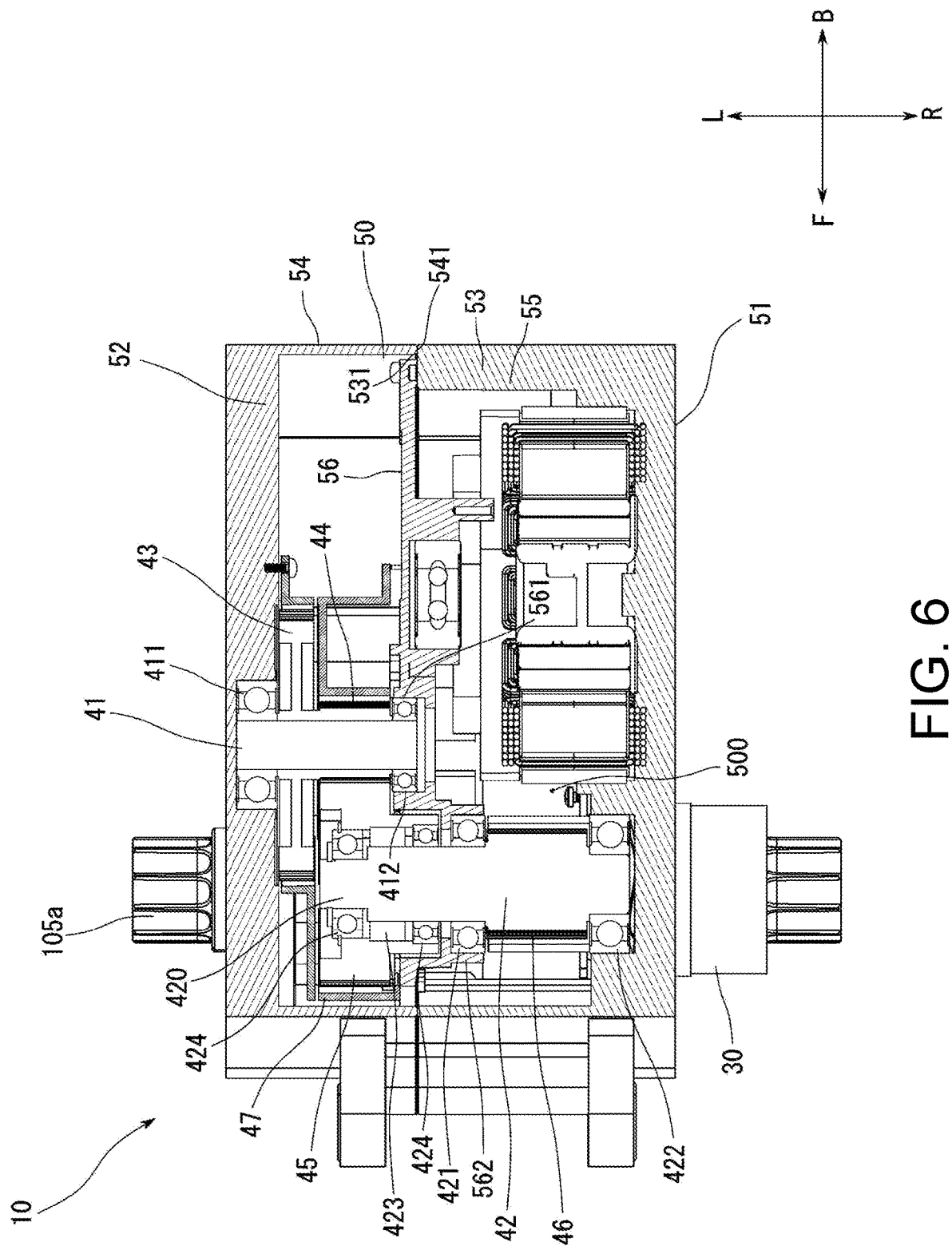
FIG. 6 is a cross-sectional view of the drive device.

FIG. 2 is a perspective view of the drive device 10 from below. FIG. 3 is a perspective view from the upper left of the inside of the drive device 10 from which a second plate member 52 and a second cylinder part 54 are removed. FIG. 4 is a perspective view from the lower left of the inside of the drive device 10 from which the second plate member 52 and the second cylinder part 54 are removed. FIG. 5 is a schematic perspective view showing engagement between gears of gear parts. FIG. 6 is a cross-sectional view of the drive device 10.

As shown in FIG. 2 to FIG. 6, the drive device 10 includes the motor 20, the output part 30, a gear part 40, and a housing 50.

The motor 20 is a DC brushless motor. The motor 20 is driven by power from the power supply part 104. The motor 20 includes a rotor (not shown) that rotates about a central axis J1 and a stator (not shown) that is positioned outside the rotor in the radial direction. That is, the motor 20 is an inner rotor type motor in which a rotor is rotatably disposed inside the stator. Here, the motor 20 is not limited to the inner rotor type motor, and may be an outer rotor type motor. In addition, the motor 20 has a motor shaft 21. The motor shaft 21 is fixed to the rotor, extends along the central axis J1 extending in the left to right direction, and rotates about the central axis J1. As shown in FIG. 5, the motor shaft 21 protrudes to the left from the main body of the motor 20.

A driving gear 22 is disposed at the tip of the motor shaft 21, that is, at the left end. The driving gear 22 is fixed to the motor shaft 21, and rotates integrally with the motor shaft 21. Here, to fix the driving gear 22 to the motor shaft 21, a fixing method in which fixing is able to be performed firmly such as press fitting, welding, and any adhesion is able to be widely used.

Figure 7:
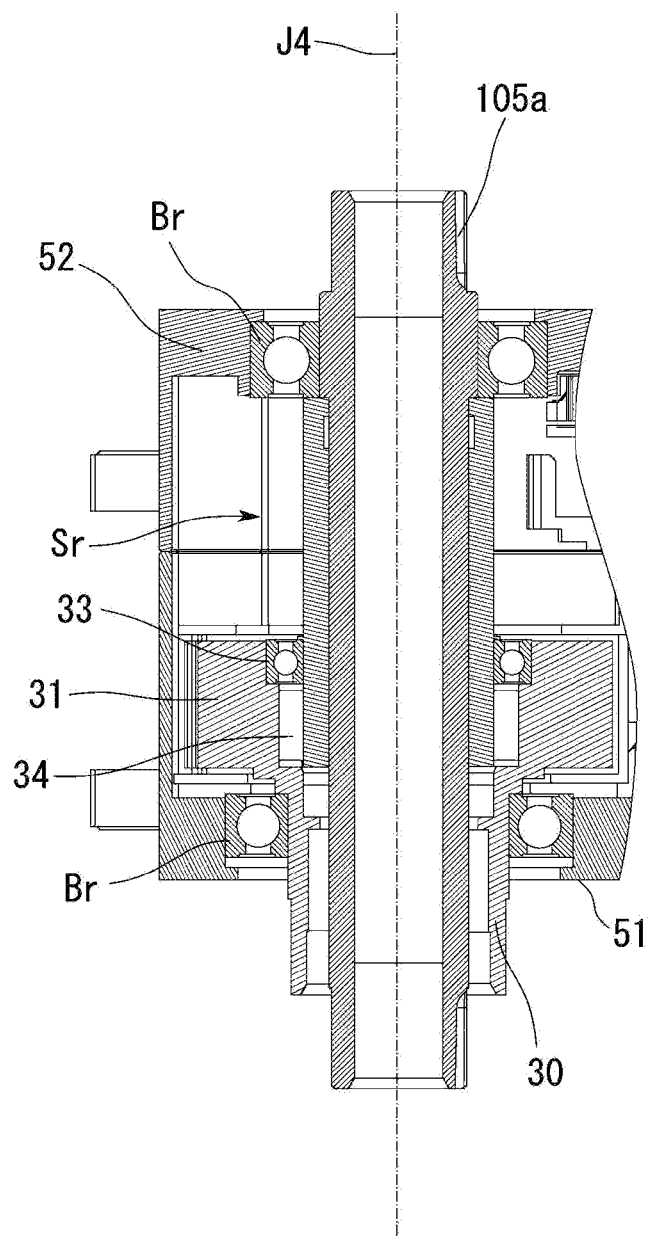
FIG. 7 is a cross-sectional view showing a crankshaft and an output part.

FIG. 7 is a cross-sectional view showing the crankshaft 105a and the output part 30. As shown in FIG. 3, FIG. 5, FIG. 7, and the like, the crankshaft 105a extends along an output axis J4. The left end of the crankshaft 105a protrudes to the left of the housing 50. In addition, the right end of the crankshaft 105a protrudes to the right of the housing 50. As described above, the left and right cranks 105 (refer to FIG. 1) are fixed to both ends of the crankshaft 105a.

In addition, the output part 30 and a torque detection part Sr are disposed on the crankshaft 105a in the direction of the output axis J4. More specifically, the output part 30 and the torque detection part Sr are disposed around the crankshaft 105a.

The torque detection part Sr detects torque acting on the crankshaft 105a. That is, the drive device 10 further includes the torque detection part Sr that detects torque acting on the crankshaft 105a. In the drive device 10 of the present embodiment, the torque detection part Sr has a sleeve fixed to the crankshaft 105a and an outer cylinder part surrounding the outside of the sleeve in the radial direction.

The outer cylinder part has a protrusion Sr1 that protrudes outward in the radial direction, and the protrusion Sr1 is fixed to a fixing part 560 (refer to FIG. 3) of a support member 56. That is, a portion of the torque detection part Sr is fixed to the support member 56. With such a configuration, a member for attaching the torque detection part Sr is able to be omitted, and the drive device 10 is able to be reduced in size. Here, the torque detection part Sr is not limited to this configuration, and any configuration in which torque of the rotating crankshaft 105a is able to be accurately detected is able to be widely used.

The output part 30 extends along the output axis J4 parallel to the central axis J1. That is, the output part 30 extends in parallel with the motor shaft 21. The output part 30 includes the output gear 31. The output part 30 covers the periphery of the crankshaft 105a at the right end of the crankshaft 105a. The power transmission system 103 is connected to the output part 30 (refer to FIG. 1). Here, the output part 30 outputs torque to the power transmission system 103. That is, the drive device 10 includes the output part 30 that outputs torque to the outside. Here, the output part 30 is connected to the crankshaft 105a via an output bearing part 33 and a one-way clutch 34. According to attachment in this manner, torque from the crankshaft 105a is transmitted to the power transmission system 103 only when torque is transmitted from the crankshaft 105a to the output part 30.

Here, in the output bearing part 33, a ball bearing is used as a bearing member, but the disclosure is not limited thereto. Any bearing structure in which the output part 30 is able to rotatably support around the crankshaft 105a is able to be widely used. One bearing member is used as the output bearing part 33, but the disclosure is not limited thereto, and a configuration in which a plurality of bearing members are used may be used. Hereinafter, when the "bearing part" is described, it has the same configuration.

The crankshaft 105a and the output part 30 are rotatably supported by the housing 50 via a bearing part Br. More specifically, the left end of the crankshaft 105a is rotatably supported on an inner surface 521 of the second plate member 52 (to be described below) of the housing 50 via the bearing part Br. In addition, the output part 30 covers the left end of the crankshaft 105a and is rotatably supported on an inner surface 511 of a first plate member 51 (to be described below) of the housing 50 via the bearing part Br. As described above, the crankshaft 105a is connected to the output part 30 via the output bearing part 33 and the one-way clutch 34. Therefore, the left end of the crankshaft 105a is rotatably supported by the first plate member 51 of the housing 50 via the output bearing part 33, the output part 30 and the bearing part Br.

The gear part 40 transmits torque of the motor shaft 21 to the output part 30. In other words, the gear part 40 transmits torque of the motor 20 to the output part 30. The gear part 40 is a deceleration mechanism that decelerates when torque is transmitted from the motor shaft 21 to the output part 30. The gear part 40 includes the first gear shaft 41, a second gear shaft 42, a first gear 43, a second gear 44, a third gear 45, and a fourth gear 46.

The first gear shaft 41 extends along a first intermediate shaft J2 parallel to the central axis J1. The first gear shaft 41 has a columnar shape, and is rotatable around the first intermediate shaft J2. The first gear shaft 41 is rotatably supported by the housing 50 via a first bearing part 411 and a second bearing part 412 disposed away from each other in the direction along the first intermediate shaft J2.

In addition, the second gear shaft 42 extends along a second intermediate shaft J3 parallel to the central axis J1 and the first intermediate shaft J2. The second gear shaft 42 has a columnar shape, and is rotatable around the second intermediate shaft J3. The second gear shaft 42 is rotatably supported by the housing 50 via a third bearing part 421 and a fourth bearing part 422 disposed away from each other in the direction along the second intermediate shaft J3.

The first gear 43 and the second gear 44 are fixed to the first gear shaft 41. The first gear 43 engages with the driving gear 22. The second gear 44 engages with the third gear 45 fixed to the second gear shaft 42. That is, the second gear 44 engages with the gear 45 fixed to the second gear shaft 42. The outer diameter of the first gear 43 is larger than the outer diameter of the second gear 44. In other words, the number of teeth of the first gear 43 is larger than the number of teeth of the second gear 44. That is, the gear part 40 includes the first gear shaft 41 to which the first gear 43 and the second gear 44 having fewer teeth than the first gear 43 are fixed.

Therefore, the torque transmitted from the driving gear 22 to the first gear shaft 41 via the first gear 43 is decelerated according to a gear ratio between the first gear 43 and the second gear 44 and transmitted to the second gear shaft 42. In addition, the number of teeth of the second gear 44 is smaller than the number of teeth of the third gear 45. Therefore, the torque of the first gear shaft 41 is also decelerated according to the gear ratio between the second gear 44 and the third gear 45 and transmitted to the second gear shaft 42.

Here, when it is described that the torque is decelerated according to a gear ratio and transmitted, it means that a rotational speed is reduced using the gear ratio as a deceleration ratio, that is, torque is amplified and transmitted while decelerating, and the same applies hereinafter.

The third gear 45 and the fourth gear 46 are provided separately. The fourth gear 46 is integrally provided with the second gear shaft 42. The third gear 45 is rotatably supported by the second gear shaft 42 via a one-way clutch 423 and a bearing part 424. According to attachment in this manner, torque is transmitted to the second gear shaft 42 only when the torque is transmitted from the second gear 44 to the third gear 45.

Here, the fourth gear 46 engages with the output gear 31. The outer diameter of the third gear 45 is larger than the outer diameter of the fourth gear 46. In other words, the number of teeth of the third gear 45 is larger than the number of teeth of the fourth gear 46. Therefore, the torque transmitted from the fourth gear 46 to the second gear shaft 42 via the output gear 31 is decelerated according to the gear ratio between the third gear 45 and the fourth gear 46. In addition, the number of teeth of the output gear 31 is larger than the number of teeth of the fourth gear 46. Therefore, the torque of the second gear shaft 42 is also decelerated according to the gear ratio between the fourth gear 46 and the output gear 31 and transmitted to the output part 30.

Here, the gear part 40 of the present embodiment has a configuration including two gear shafts, but it may have a configuration including one gear shaft or three or more gear shafts as long as a desired deceleration ratio is able to be obtained. In addition, it may have a so-called intermediate gear mechanism in which one gear is attached to one gear shaft and used for reversing the rotation direction. That is, the gear part 40 includes at least one gear shaft that is rotatably supported by the housing 50 via two bearing parts disposed away from each other in the axial direction.

Figure 8:
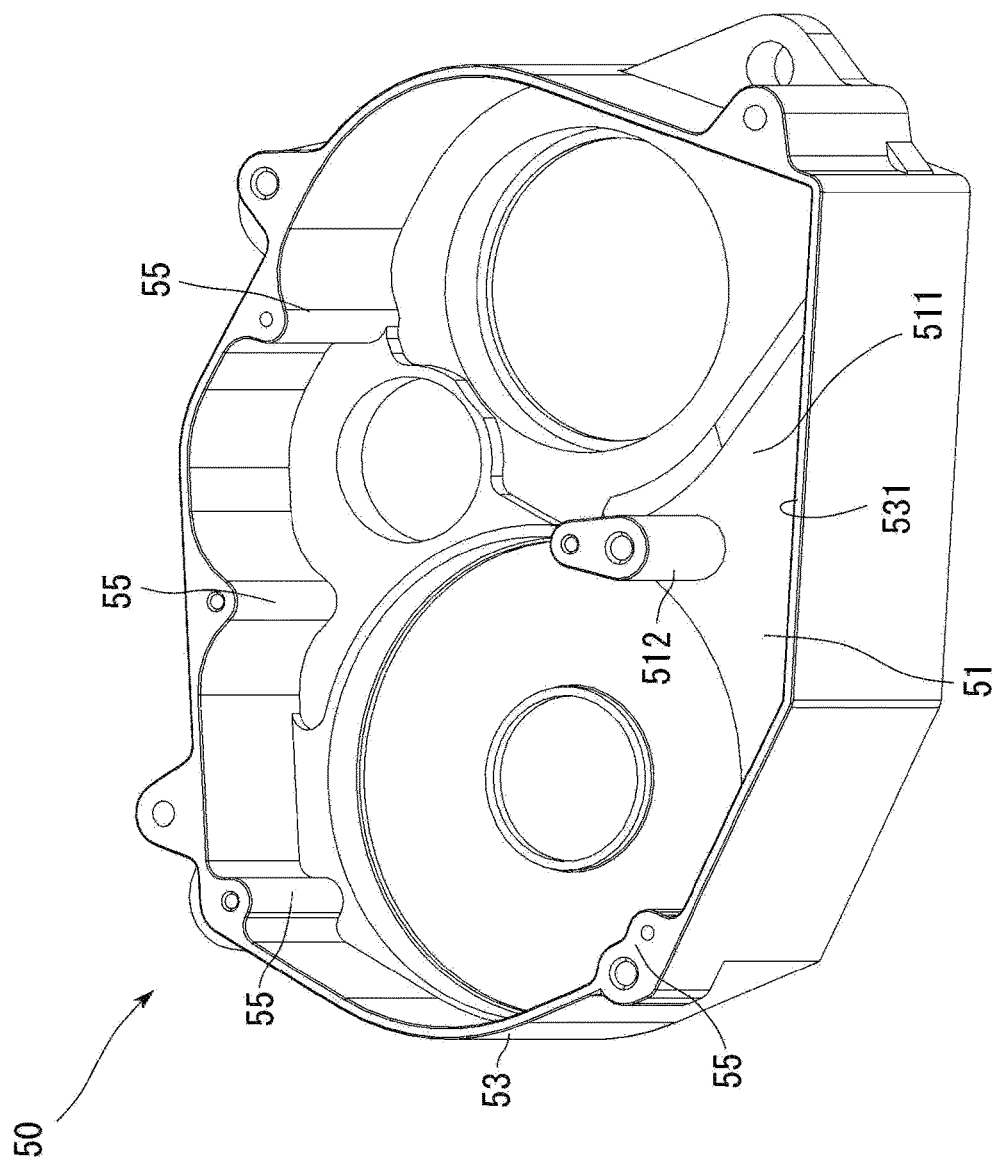
FIG. 8 is a perspective view of a first plate member and a first cylinder part.
Figure 8:
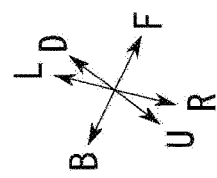
Figure 9:
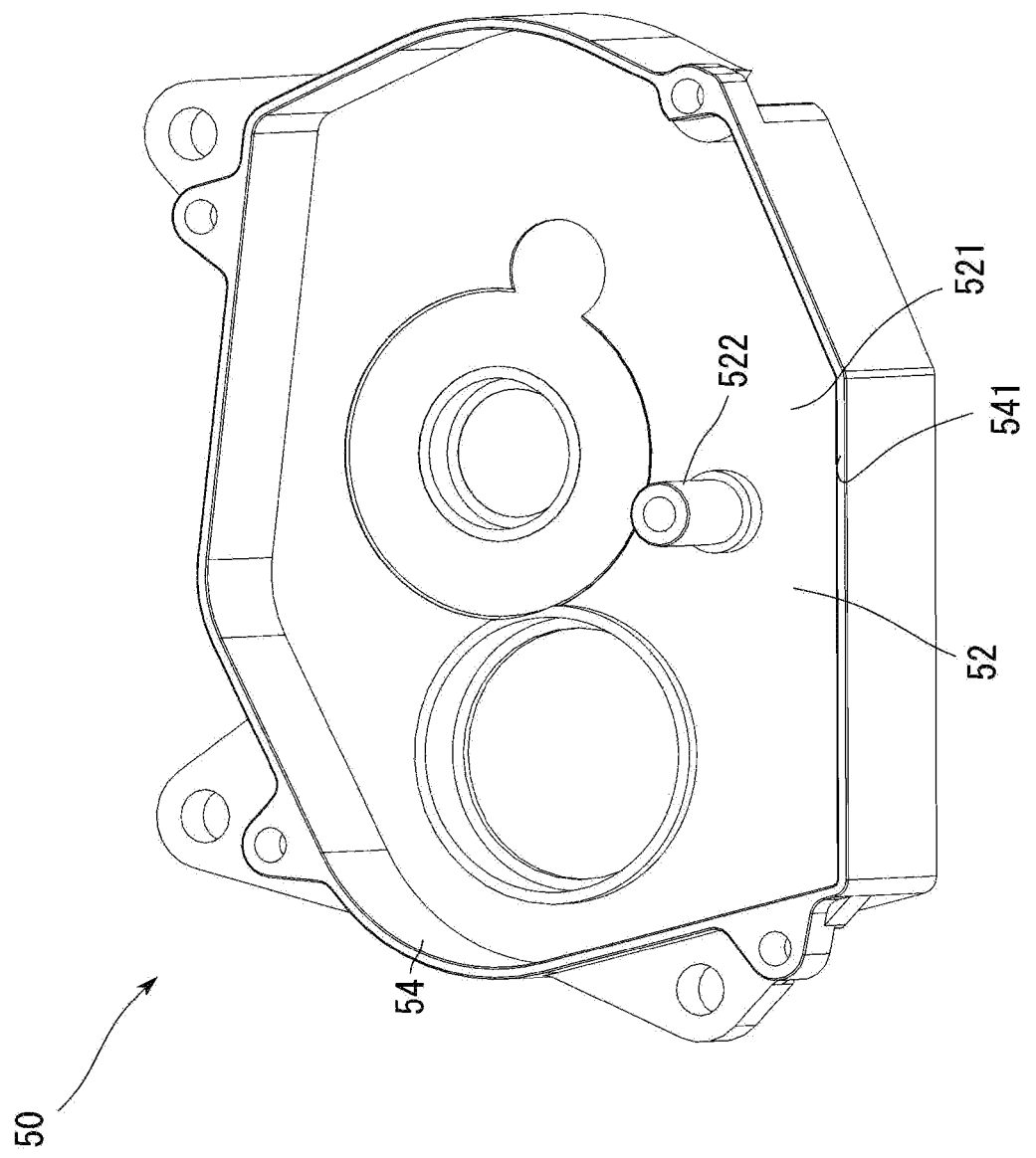
FIG. 9 is a perspective view of a second plate member and a second cylinder part.

Detailed description of the housing 50 will be described with reference to the drawings. FIG. 8 is a perspective view of the first plate member 51 and a first cylinder part 53. FIG. 9 is a perspective view of the second plate member 52 and the second cylinder part 54. As shown in FIG. 3 to FIG. 6, and the like, the housing 50 has an internal space 500. In the internal space 500, the motor 20, a portion of the output part 30, and the gear part 40 are accommodated. That is, the housing 50 has the internal space 500 in which the motor 20, a portion of the output part 30 and the gear part 40 are accommodated.

As shown in FIG. 1 to FIG. 9, and the like, the housing 50 includes the first plate member 51, the second plate member 52, the first cylinder part 53, and the second cylinder part 54. As shown in FIG. 6, the housing 50 includes the first plate member 51 and the second plate member 52 that face the internal space 500 and face each other in the axial direction. More specifically, the first plate member 51 is disposed on the right side of the internal space 500, and the second plate member 52 is disposed on the left side of the internal space 500.

As shown in FIG. 8, the first cylinder part 53 protrudes to the left in the axial direction from the inner surface 511 that faces the internal space 500 of the first plate member 51. That is, the housing 50 includes the first cylinder part 53 extending in the axial direction from the outer edge part of the surface 511 that faces the second plate member 52 of the first plate member 51. Here, in the present embodiment, the first cylinder part 53 is defined by a single member with the first plate member 51, but the disclosure is not limited thereto, and they may be defined by different members, and fixed by a fixing method such as adhesion or screwing.

As shown in FIG. 9, the second cylinder part 54 protrudes to the right in the axial direction from the inner surface 521 that faces the internal space 500 of the second plate member 52. That is, the housing 50 includes the second cylinder part 54 extending in the axial direction from the outer edge part of the surface 521 that faces the first plate member 51 of the second plate member 52. Here, in the present embodiment, the second cylinder part 54 is defined by a single member with the second plate member 52, but the disclosure is not limited thereto, and they may be defined by different members and fixed by a fixing method such as adhesion or screwing.

As shown in FIG. 1, FIG. 6, and the like, at least portions of end surfaces of the first cylinder part 53 and the second cylinder part 54 facing each other in the axial direction come into contact with each other. More specifically, an end surface 531 on the left side of the first cylinder part 53 in the axial direction and an end surface 541 on the right side of the second cylinder part 54 in the axial direction face each other in the axial direction. Here, the end surface 531 of the first cylinder part 53 and the end surface 541 of the second cylinder part 54 come into contact with each other in a portion other than the portion in contact with the support member 56 to be described below. Thereby, the internal space 500 surrounded by the housing 50 is defined.

In addition, the first cylinder part 53 includes a protrusion part 55. The protrusion part 55 protrudes inward from the first cylinder part 53. Here, "protruding inward" indicates a configuration in which the surface of the first cylinder part 53 facing the internal space 500 protrudes into the internal space 500. Here, in the present embodiment, the four protrusion parts 55 are provided in the first cylinder part 53, but the number thereof is not limited thereto, and any number may be sufficient as long as the support member 56 is able to be firmly fixed. According to a configuration in which the protrusion part 55 protrudes inward from the first cylinder part 53, the rigidity of the protrusion part 55 increases. Thereby, the protrusion part 55 is less likely to bend, and the fixing strength of the support member 56 is able to increase.

The protrusion part 55 extends in the axial direction, and the right end is connected to the first plate member 51. That is, when the protrusion part 55 protrudes from the first cylinder part 53, it is connected to the first plate member 51. Here, a case in which the protrusion part 55 is connected to the first plate member 51 may include any of a case in which the protrusion part 55 is defined by a single member with the first plate member 51, a case in which the protrusion part 55 is fixed to the first plate member 51 and a case in which the protrusion part 55 comes into contact with the first plate member 51. With such a configuration, since the force of the protrusion part 55 in the axial direction is able to be supported by the first plate member 51, movement and deformation of the support member 56 fixed to the protrusion part 55 in the axial direction are minimized.

Here, in the housing 50 of the present embodiment, the protrusion part 55 is defined by a single member with the first plate member 51, but the disclosure is not limited thereto. For example, in the case in which the first plate member 51 and the first cylinder part 53 are defined by different members and fixed, a configuration in which the protrusion part 55 comes in contact with the first plate member 51 but is not fixed may be used. In addition, the protrusion part 55 may not be connected to the first plate member 51.

In addition, the protrusion part 55 is provided in the first cylinder part 53, but may be provided in the second cylinder part 54 or may be provided in both. That is, the housing 50 further includes the protrusion part 55 protruding inward from at least one of the first cylinder part 53 and the second cylinder part. When the protrusion part 55 is provided in the second cylinder part 54, the protrusion part 55 may extend in the axial direction, and the left end may be connected to the second plate member 52. That is, when the protrusion part 55 protrudes from the second cylinder part 54, it is connected to the second plate member 52.

With such a configuration, since the force of the protrusion part 55 in the axial direction is able to be supported by the second plate member 52, movement and deformation of the support member 56 fixed to the protrusion part 55 in the axial direction are minimized.

In addition, the housing 50 includes the support member 56 disposed inside the internal space 500. Here, in the present embodiment, the support member 56 that is accommodated inside the internal space 500 is disposed, but the disclosure is not limited thereto, and a portion thereof may be disposed outside the housing 50 or exposed to the outside. That is, the housing 50 includes the support member 56 of which at least a portion is disposed in the internal space 500.

Figure 10:
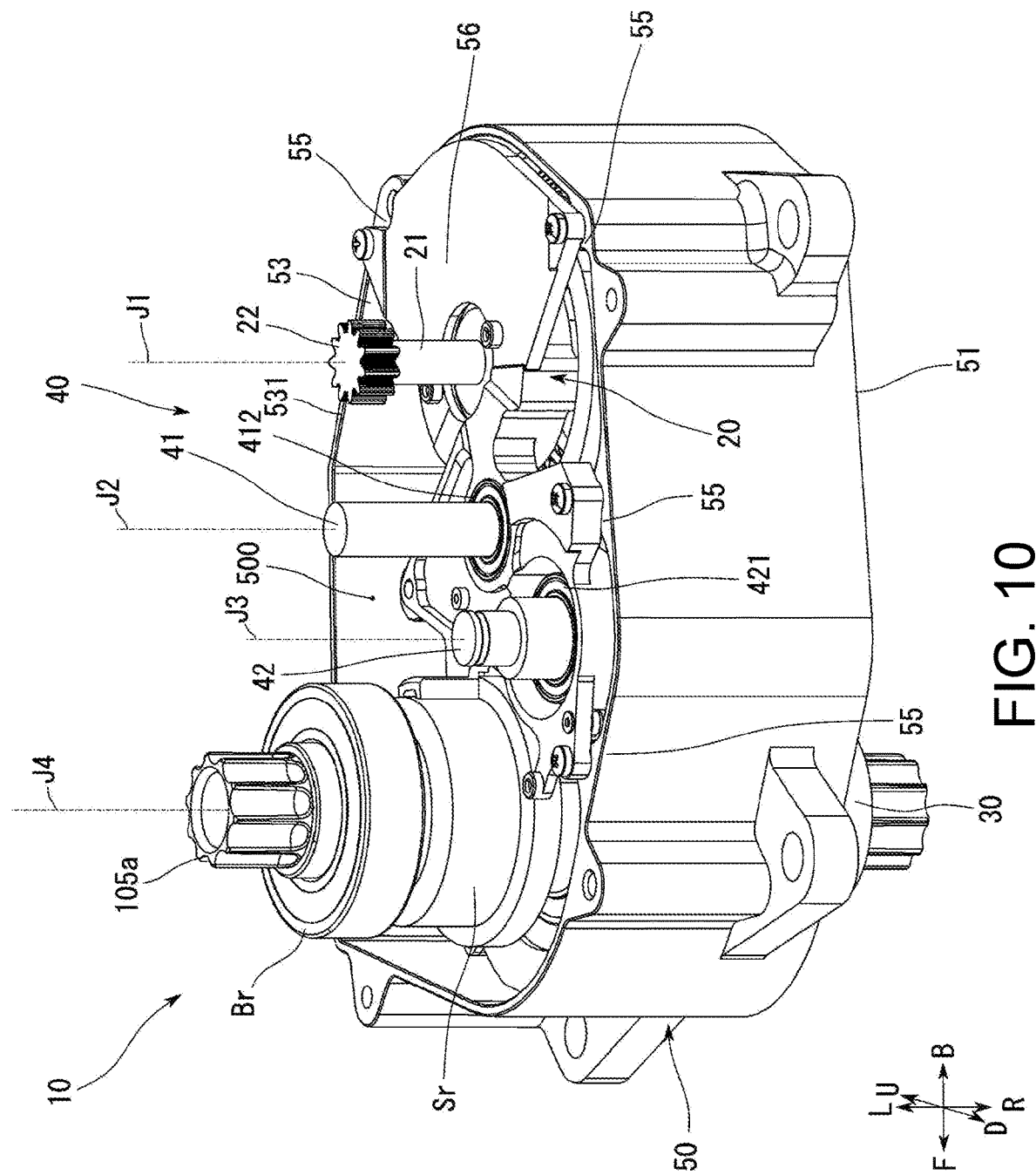
FIG. 10 is a perspective view of a support member which supports a motor and a gear part and is fixed to a first cylinder part.

The support member 56 is a plate material extending in a direction intersecting the axial direction. In the housing 50 according to the present embodiment, the support member 56 supports the motor 20 and the gear part 40. FIG. 10 is a perspective view of the support member 56 which supports the motor 20 and the gear part 40 and is fixed to the first cylinder part 53. As shown in FIG. 10, the support member 56 is fixed to the protrusion part 55 provided in the first cylinder part 53 with a fixing tool such as a screw. In addition, the support member 56 is interposed between the bottom of a first pillar part 512 and the bottom of a second pillar part 522 in the axial direction, which will be described below. Here, the support member 56 is fastened together with a fixing tool such as a screw inserted into the first pillar part 512 and the second pillar part 522 from the outside of the housing 50. That is, the support member 56 is fixed to the protrusion part 55, the first pillar part 512 and the second pillar part 522.

The support member 56 is fixed to the protrusion part 55 with, for example, a screw. In addition, a screw penetrates through the support member 56 interposed between the first pillar part 512 and the second pillar part 522, and the first pillar part 512, the second pillar part 522 and the support member 56 are fixed by fastening together. Thereby, the support member 56 is fixed in the internal space 500 of the housing 50.

The housing 50 includes the first pillar part 512 protruding to the left in the axial direction from a region surrounded by the first cylinder part 53 of the inner surface 511 of the first plate member 51. In addition, the housing 50 includes the second pillar part 522 protruding to the right in the axial direction from a region surrounded by the second cylinder part 54 of the inner surface 521 of the second plate member 52.

The first pillar part 512 and the second pillar part 522 have a bottomed tubular shape, and when the end surface 531 of the first cylinder part 53 and the end surface 541 of the second cylinder part 54 are brought into contact with each other and fixed, the bottom of the first pillar part 512 and the bottom of the second pillar part 522 face each other in the axial direction, and the support member 56 is inserted therebetween from both sides in the axial direction. Here, in the housing 50 of the present embodiment, pillar parts are provided on both the first plate member 51 and the second plate member 52, but the disclosure is not limited thereto, and the pillar part may be provided on either the first plate member 51 or the second plate member 52.

That is, the housing 50 further includes the pillar parts 512 and 522 protruding toward the internal space 500 in the axial direction from at least one of the region surrounded by the first cylinder part 53 of the first plate member 51 and the region surrounded by the second cylinder part of the second plate member 52. With such a configuration, the support part of the support member 56 is able to be distributed, and concentration of stress on the support member 56 is able to be minimized. Therefore, even if the rigidity of the support member 56 is low, the motor 20 and the gear part 40 are able to be supported, and the support member 56 is able to be reduced in size and simplified. Thereby, the proportion of the support member 56 with respect to the internal space 500 is able to be reduced, and as a result, the drive device 10 is able to be reduced in size.

Here, only the first pillar part 512 may be provided, and the support member 56 may be fixed to the first pillar part 512. That is, the pillar part 512 comes into contact with only a surface of the support member 56 on the other side in the axial direction. With such a configuration, the surface of the support member 56 on the other side and the pillar part 512 come into contact with each other, and thus neither the gear shaft nor the pillar part is disposed on one side in the axial direction. Thereby, the housing 50 is able to be reduced in size or a region in which another member is disposed is able to be provided in the internal space of the housing, and the drive device itself is able to be reduced in size.

The support member 56 includes a first through-hole 561, a second through-hole 562, and a motor support hole 563 (refer to FIG. 3 and FIG. 4). The motor 20 is fixed to the first plate member 51. In addition, the motor shaft 21 penetrates through the motor support hole 563, and is rotatably supported by the support member 56 via a motor bearing part 23. That is, the motor shaft 21 extends in the axial direction and is rotatably supported by the support member 56 via the motor bearing part 23. More specifically, the outer ring of the motor bearing part 23 is fixed to the motor support hole 563, and the motor shaft 21 is fixed to the inner ring. With such a configuration, it is possible to minimize positional displacement between the motor shaft 21 and the gear shafts 41 and 42. Thereby, the torque of the motor shaft 21 is able to be accurately transmitted to the gear part 40.

In addition, the first gear shaft 41 is rotatably supported on the inner surface 521 of the second plate member 52 via the first bearing part 411. The outer ring of the second bearing part 412 is fixed to the first through-hole 561 of the support member 56, and the first gear shaft 41 is fixed to the inner ring. Thereby, the first gear shaft 41 is rotatably supported by the second plate member 52 via the first bearing part 411, and rotatably supported by the support member 56 via the second bearing part 412.

The second gear shaft 42 is rotatably supported on the inner surface 511 of the first plate member 51 via the fourth bearing part 422. The outer ring of the fourth bearing part 422 is fixed to the second through-hole 562, and the second gear shaft 42 is fixed to the inner ring. Thereby, the second gear shaft 42 is rotatably supported by the first plate member 51 via the fourth bearing part 422, and rotatably supported by the support member 56 via the third bearing part 421. That is, the gear part 40 includes the second gear shaft 42 that is disposed in parallel with the first gear shaft 41 and is rotatably supported by the support member 56.

That is, at least one gear shaft 42 is rotatably supported by the support member 56 via the bearing part 422 on one side in the axial direction. With such a configuration, the gear shaft 42 of the gear part 40 supported by the housing 50 and the support member 56 is able to be shortened and the gear part 40 is able to be reduced in size accordingly. Thereby, the housing 50 is able to be reduced in size or a region in which another member is disposed is able to be provided in the internal space 500 of the housing 50, and the drive device 10 is able to be reduced in size. In addition, since the gear shaft 42 is able to be shortened, distortion of the gear shaft 42 is able to be minimized. Thereby, it is possible to minimize a delay in torque transmission due to distortion.

In addition, the second gear shaft 42 includes a shaft protrusion part 420 (refer to FIG. 6) that protrudes to the left relative to the support member 56. The third gear 45 and the fourth gear 46 are attached to the shaft protrusion part 420 protruding to the left relative to the support member 56 of the second gear shaft 42. That is, the gear part 40 includes at least one gear shaft 42 which extends in the axial direction and to which at least one gear 45 is fixed.

The second gear shaft 42 is rotatably supported by the support member 56 and the first plate member 51 via the third bearing part 421 and the fourth bearing part 422. Therefore, the second gear shaft 42 does not protrude to the left relative to the third gear 45. Thereby, in the internal space 500, a space is able to be provided between the third gear 45 and the second plate member 52. The first gear 43 is able to be disposed in this space. Therefore, the gear part 40 is able to be disposed densely, and members are able to be efficiently disposed in the internal space 500. Thereby, the drive device 10 is able to be reduced in size.

In addition, in the gear part 40, when viewed in the direction of the second intermediate shaft J3, the first gear 43 is able to be disposed at a position overlapping the second gear shaft 42. That is, a portion of the first gear 43 faces the end surface of the second gear shaft 42 in the axial direction. Since the first gear 43 and the second gear shaft 42 do not interfere with each other, the diameter of the first gear 43 is able to be increased without increasing the size of the internal space 500. Thereby, the deceleration ratio of the gear part 40 is able to be increased without increasing the size of the drive device 10.

In addition, the right end of the first gear shaft 41 is rotatably supported by the support member 56 via the second bearing part 412. Therefore, the first gear shaft 41 does not protrude to the right relative to the support member 56. Therefore, when viewed in the direction of the first intermediate shaft J2, a portion of the motor 20 is able to be disposed in a portion overlapping the first gear shaft 41 on the right relative to the support member 56. Thereby, members in the internal space 500 are able to be densely disposed, and the housing 50, that is, the drive device 10, is able to be reduced in size.

Figure 11:
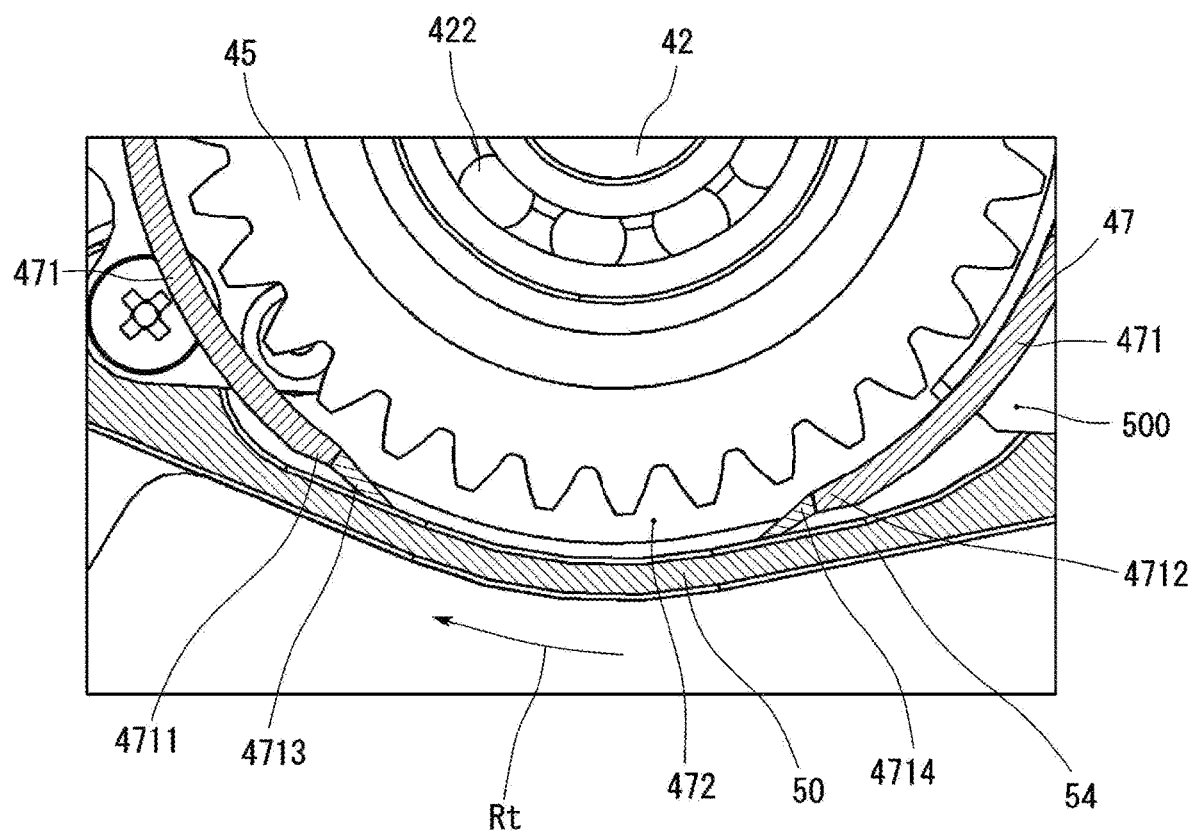
FIG. 11 is an enlarged cross-sectional view of an enlarged opening of a gear case.

FIG. 11 is an enlarged cross-sectional view of an enlarged opening 472 of a gear case 47. The gear part 40 includes the gear case 47 and a gear cover 48. The gear case 47 accommodates the third gear 45. That is, the gear part 40 includes the gear case 47 accommodating the gear 45. The gear cover 48 is disposed on the left side of the third gear 45 in the axial direction and covers the left side of the third gear 45 in the axial direction.

The gear case 47 includes a wall part 471 which faces an outer circumferential surface of the third gear 45 in the radial direction and extends in the circumferential direction, and the opening 472 which is adjacent to the wall part 471 in the circumferential direction and penetrates in the radial direction. The wall part 471 is disposed outside the third gear 45 in the radial direction and extends in the circumferential direction. The opening 472 faces the second cylinder part 54 of the housing 50 in the radial direction. That is, the opening 472 faces the housing 50 in the radial direction.

The wall part 471 is adjacent to both sides of the opening 472 in the circumferential direction. In a rotation direction Rt of the third gear 45, the end that is disposed on the front side of the opening 472 of the wall part 471 and adjacent to the opening 472 is a front end 4711. In addition, the end that is disposed on the rear side of the opening 472 of the wall part 471 and adjacent to the opening 472 is a rear end 4712. That is, the wall part 471 includes the front end 4711 disposed on a front side of the gear 45 in the rotation direction Rt relative to the opening 472. The wall part 471 includes the rear end 4712 disposed behind the gear 45 in the rotation direction Rt relative to the opening 472.

As shown in FIG. 11, the front end 4711 comes into contact with the inner surface of the second cylinder part 54 of the housing 50. That is, the front end 4711 comes into contact with the housing 50. More specifically, the front end 4711 of the wall part 471 comes into contact with the cylinder part 54 surrounding the internal space 500 of the housing 50.

With such a configuration, the third gear 45 and the gear case 47 are able to be disposed close to the second cylinder part 54 of the housing 50 by the thickness of the wall part 471 of the gear case 47. Thereby, the housing 50 is able to be reduced in size, and the drive device 10 is able to be reduced in size accordingly.

In the gear part 40, a lubricant is interposed between the gears. Here, a highly viscous lubricant, a so-called grease-like lubricant, is used for lubricating the gears. The gear case 47 has the opening 472, and when the second cylinder part 54 of the housing 50 is disposed outside the opening 472, the lubricant for lubricating the third gear 45 is able to move a portion near the second cylinder part 54 of the housing 50, and temperature rise of the lubricant is able to be minimized. Thereby, it is possible to minimize a decrease in the lubrication capacity of the lubricant.

The grease-like lubricant adheres to the outer circumferential surface of the third gear 45, and friction between the gears and wear is able to be minimized. On the other hand, the grease-like lubricant tends to form lumps. When the lubricant becomes a lump to some extent, it blows to the outside of the third gear 45 in the radial direction with a centrifugal force. In this case, since the third gear 45 is rotating, the lubricant blows to the front in the rotation direction and to the outside in the radial direction.

Here, the front end 4711 of the wall part 471 includes a front elastic part 4713. The front elastic part 4713 comes into contact with the second cylinder part 54. That is, the front end 4711 of the wall part 471 includes the front elastic part 4713 that is elastically deformable, and the front elastic part 4713 comes into contact with the housing 50.

Thereby, the front end 4711 of the wall part 471 of the gear case 47 and the second cylinder part 54 come into contact with each other more reliably. Therefore, the lubricant blown to the outside in the radial direction with a centrifugal force due to rotation of the third gear 45 is able to be received more reliably. As a result, the lubricant is unlikely to enter between the gear case 47 and the second cylinder part 54 of the housing 50.

In addition, the front elastic part 4713 extends to the outside in the radial direction toward the rear of the third gear 45 in the rotation direction. That is, the front elastic part 4713 extends to the outside in the radial direction toward the rear of the gear 45 in the rotation direction. With such a configuration, when the lubricant scattered to the side of the second cylinder part 54 of the housing 50 moves due to rotation of the third gear 45, the lubricant is able to be scooped in the front elastic part 4713.

In addition, the rear end 4712 may come into contact with the second cylinder part 54 of the housing 50. That is, the rear end 4712 may come into contact with the housing 50. With such a configuration, it is possible to prevent the lubricant from entering between the gear case 47 and the housing 50.

In addition, the rear end 4712 of the wall part 471 includes a rear elastic part 4714. Here, the rear elastic part 4714 is elastically deformable and comes into contact with the second cylinder part 54 of the housing 50. That is, the rear end 4712 of the wall part 471 includes the elastic part 4714 that is elastically deformable, and the rear elastic part 4714 comes into contact with the housing 50. With such a configuration, it is possible to further prevent the lubricant from entering between the gear case 47 and the housing 50.

Figure 12:
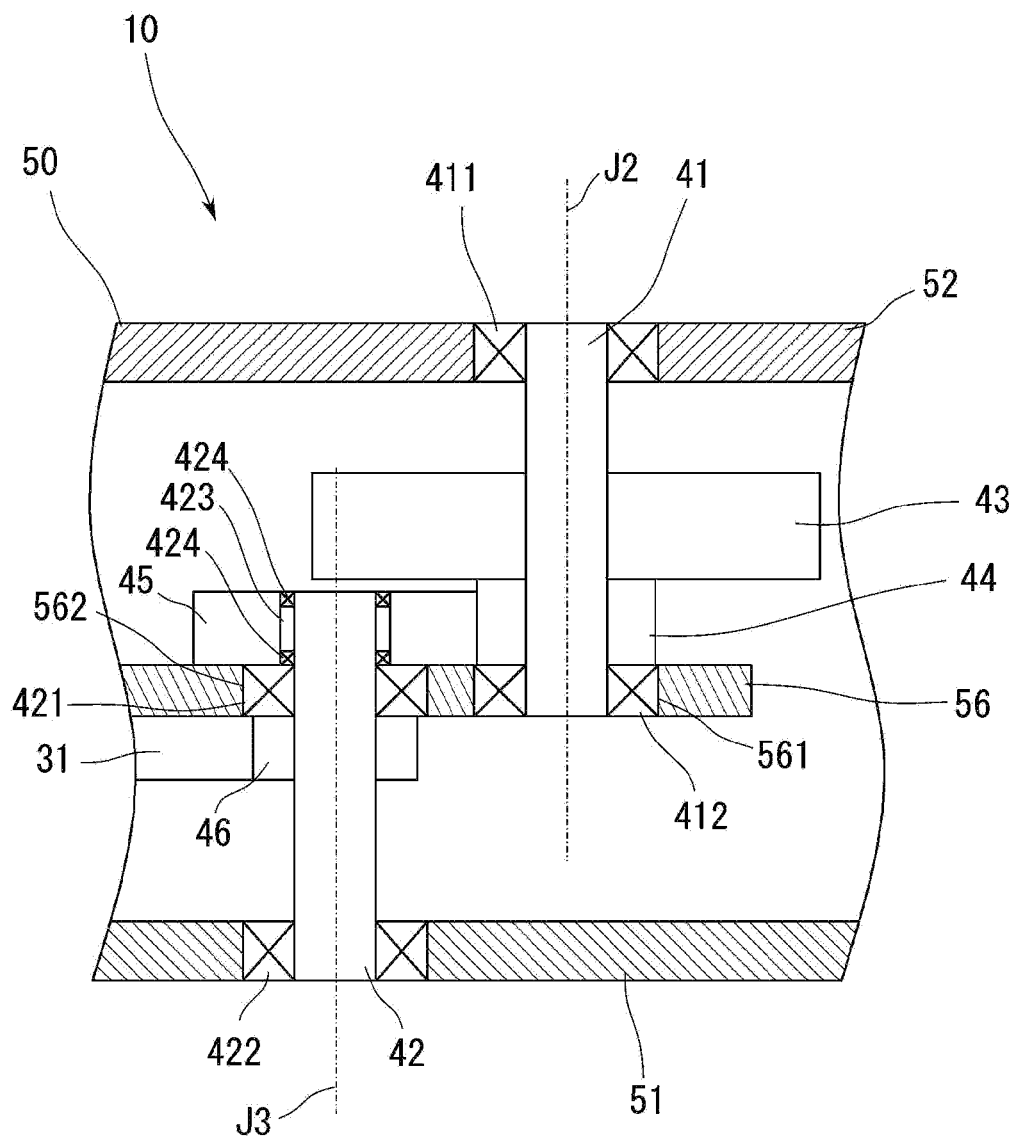
FIG. 12 is a schematic deployment diagram of a second gear shaft of a first modification.

FIG. 12 is a schematic deployment diagram of the second gear shaft 42 of a first modification. This modification is different in the above example in that the third gear 45 and the fourth gear 46 of the second gear shaft 42 are disposed away from each other in the axial direction. Except for this, the configuration is the same as that of the drive device 10. Therefore, the same reference numerals are assigned as reference numerals of components, and detailed description will be omitted.

As shown in FIG. 12, the third gear 45 and the fourth gear 46 are disposed away from each other in the axial direction. Here, the third gear 45 is fixed to the second gear shaft 42, and the fourth gear 46 is attached to the second gear shaft 42 via the one-way clutch 423 and the bearing part 424. That is, the gear shaft includes at least one gear 45. Here, at least one of gear shafts supported by the support member 56 via the bearing part 422 has the shaft protrusion part 420 that protrudes to one side in the axial direction relative to the support member 56.

Here, the third gear 45 is disposed to the left relative to the support member 56, and the fourth gear is disposed to the right relative to the support member 56. That is, at least one of the gears is attached to the shaft protrusion part 420. According to disposition in this manner, the second gear shaft 42 is able to be provided shorter. Thereby, the drive device 10 is able to be reduced in size.

Figure 13:
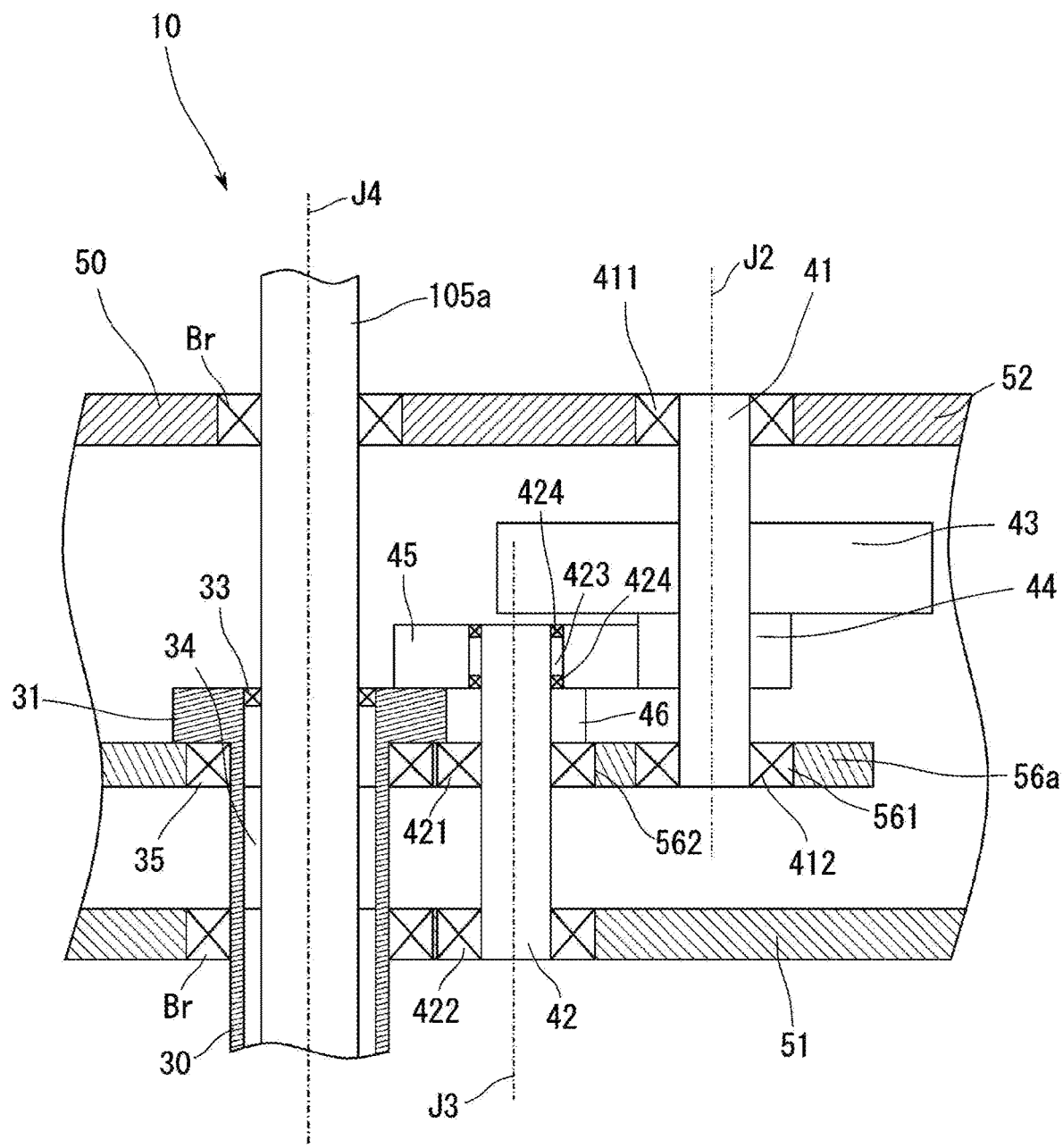
FIG. 13 is a schematic deployment diagram of a support member of a second modification.

FIG. 13 is a schematic deployment diagram of a support member 56a of a second modification. In this modification, the support member 56a is different from the support member 56. Except for this, the configuration is the same as that of the drive device 10. Therefore, the same reference numerals are assigned to members other than the support member 56a, and detailed description will be omitted. As shown in FIG. 13, the support member 56a may rotatably support the output part 30 via a fifth bearing part 35. That is, the output part 30 extends in the axial direction and is rotatably supported by the support member 56a via the fifth bearing part 35. In this manner, it is possible to minimize positional displacement between the output part 30 of the support member 56a and the first gear shaft 41 and the second gear shaft 42. Thereby, it is possible to minimize a tilt of the output part 30, that is, the crankshaft 105a, with respect to the gear part 40.

Figure 14:
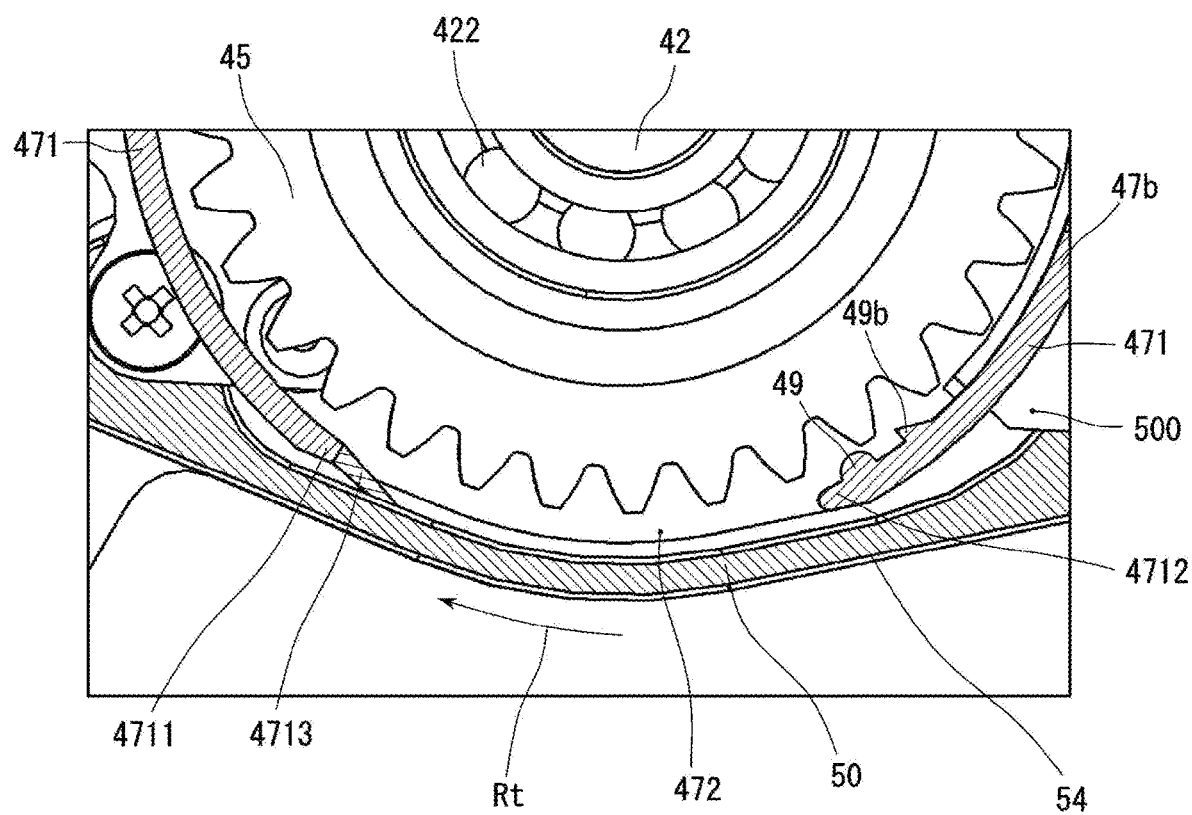
FIG. 14 is an enlarged cross-sectional view of an enlarged opening of a gear case of a third modification.

FIG. 14 is an enlarged cross-sectional view of an enlarged opening 472 of a gear case 47b of a third modification. The gear case 47b of this modification is different from the gear case 47 shown in FIG. 11, and the like in that a rib 49 and a rib 49b are provided. Parts of the gear case 47b except for this have substantially the same configuration as the gear case 47. Therefore, the same reference numerals are assigned to the substantially the same parts as the gear case 47 of the gear case 47b, and detailed description of the same parts will be omitted.

As shown in FIG. 14, the rib 49 and the rib 49b that protrude toward the third gear 45 from the inner surface of the wall part 471 of the gear case 47b are provided. That is, the wall part 471 of the gear case 47b includes the ribs 49 and 49b that protrude inward in the radial direction from the surface that faces the outer circumferential surface of the gear 45 in the radial direction and face the outer circumferential surface of the gear 45 with a gap therebetween.

With such a configuration, the lubricant adhered to the outer circumferential surface of the gear 45 is able to be thinly leveled along the outer circumferential surface of the gear 45. Thereby, it is possible to prevent the lubricant from becoming lumps, and it is possible to prevent the lubricant from scattering to the outside in the radial direction. In addition, the lubricant is able to be stably adhered to the gear 45, and the effect of lubricating the gear 45 is able to be improved.

As shown in FIG. 14, the rib 49 is provided at the rear end 4712 of the wall part 471. With such a configuration, it is possible to prevent the lubricant from scattering to the outside from the opening 472, and it is possible to prevent the lubricant from entering between the gear case 47b and the housing 50.

As shown in FIG. 14, the rib 49 has a curved surface shape in which the facing surface that faces the outer circumferential surface of the gear 45 protrudes toward the gear 45. With such a configuration, when the gear 45 comes into contact with the rib 49 due to vibration or the like, since the teeth of the gear 45 come into contact with the curved surface, both the gear 45 and the rib 49 are less likely to be damaged. Thereby, the drive device 10 is able to be operated stably for a long time.

In addition, like the rib 49b shown in FIG. 14, the facing surface that faces the outer circumferential surface of the gear 45 may have an inclination in which the outer circumferential surface of the gear 45 approaches toward the front of the gear 45 in the rotation direction Rt. With such a configuration, the lubricant in contact with the facing surface is able to be efficiently applied to the outer circumferential surface of the gear 45. Thereby, it is possible to prevent the lubricant from scattering to the outside from the opening 472 and from entering between the gear case 47b and the housing 50.

As described above, a configuration in which the gear cases 47 and 47b accommodate the third gear 45 attached to the second gear shaft 42 has been exemplified, but the disclosure is not limited thereto. Gears other than the third gear 45 may be accommodated.

The disclosure can be used for, for example, an electric vehicle such as an electrically assisted bicycle, an electric scooter, or an electric wheelchair, which obtains a driving force from power.

Features of the above-described preferred embodiments and the modifications thereof may be combined appropriately as long as no conflict arises.

While preferred embodiments of the present disclosure have been described above, it is to be understood that variations and modifications will be apparent to those skilled in the art without departing from the scope and spirit of the present disclosure. The scope of the present disclosure, therefore, is to be determined solely by the following claims.

What is claimed is:

1. A drive device, comprising:
    a motor configured to rotate about a central axis;
    an output part configured to rotate about an output axis and output torque to the outside, wherein the output axis is different from the central axis and parallel to the central axis;
    a gear part transmitting torque of the motor to the output part; and
    a housing having an internal space in which the motor, a portion of the output part, and the gear part are accommodated,
    wherein the gear part comprises
        at least one gear shaft extending in an axial direction, to which at least one gear is fixed, and
        a gear case accommodating the at least one gear,
    wherein the gear case comprises
        a wall part facing an outer circumferential surface of the accommodated at least one gear in a radial direction and extending in a circumferential direction, and
        an opening penetrating over the wall part in the radial direction,
        wherein the opening faces the housing in the radial direction,
    wherein the wall part has a front end disposed on a front side of the at least one gear in a rotation direction with respect to the opening, and
    wherein the front end contacts the housing.

2. The drive device according to claim 1, wherein the front end of the wall part contacts a cylinder part surrounding the internal space of the housing.

3. The drive device according to claim 1,
    wherein the front end of the wall part comprises a front elastic part that is elastically deformable, and
    wherein the front elastic part contacts the housing.

4. The drive device according to claim 3, wherein the front elastic part extends to the outside in the radial direction toward the rear of the at least one gear in the rotation direction.

5. The drive device according to claim 1,
    wherein the wall part comprises a rear end disposed to the rear of the at least one gear in the rotation direction with respect to the opening, and
    wherein the rear end contacts the housing.

6. The drive device according to claim 5,
    wherein the rear end of the wall part comprises a rear elastic part that is elastically deformable, and
    wherein the rear elastic part contacts the housing.

7. The drive device according to claim 1, wherein the wall part comprises a rib that protrudes inward in the radial direction from a surface facing the outer circumferential surface of the at least one gear in the radial direction, and faces the outer circumferential surface of the at least one gear with a gap therebetween.

8. The drive device according to claim 7,
    wherein the wall part comprises a rear end disposed to the rear of the at least one gear in the rotation direction with respect to the opening, and
    wherein the rib is provided at the rear end of the wall part.

9. The drive device according to claim 7, wherein the rib has a curved surface shape in which a facing surface facing the outer circumferential surface of the at least one gear protrudes toward the at least one gear.

10. The drive device according to claim 7, wherein the rib approaches the outer circumferential surface of the at least one gear as a facing surface facing the outer circumferential surface of the at least one gear moves toward to the front of the at least one gear in the rotation direction.

11. An electric vehicle, comprising:
    the drive device according to claim 1;
    a power supply part supplying power to the motor; and
    a power transmission system transmitting an output from the output part to a wheel.

* * * * *